(12) United States Patent
Sayer et al.

(10) Patent No.: US 9,416,709 B2
(45) Date of Patent: Aug. 16, 2016

(54) COKING RESISTANT AFTER-TREATMENT DOSING VALUE

(75) Inventors: Hamid Sayer, Newport News, VA (US); Michael J. Hornby, Wiliiamsburg, VA (US); Perry Robert Czimmek, Williamsburg, VA (US); Christopher Lee Szymanski, Winsor, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 651 days.

(21) Appl. No.: 13/524,039

(22) Filed: Jun. 15, 2012

(65) Prior Publication Data

US 2013/0333361 A1 Dec. 19, 2013

(51) Int. Cl.
*F02M 47/00* (2006.01)
*F01N 3/20* (2006.01)
*F01N 3/36* (2006.01)

(52) U.S. Cl.
CPC ........... *F01N 3/2066* (2013.01); *F01N 3/36* (2013.01); *F01N 2610/02* (2013.01); *F01N 2610/03* (2013.01); *F01N 2610/1453* (2013.01); *F01N 2610/1493* (2013.01); *F02M 47/00* (2013.01); *Y02T 10/24* (2013.01); *Y10T 137/7929* (2015.04)

(58) Field of Classification Search
CPC ............ F02M 47/027; F02M 63/0003; F02M 47/025; F02M 47/00; F02M 63/0035; F02M 61/1866; F02M 21/0269; F02M 61/20; F02M 63/001; F01N 3/2066; F01N 2610/02; F01N 2610/03; F01N 2610/1453; F01N 2610/1493; F01N 3/36; Y10T 137/7929; Y02T 10/24
USPC ............... 123/698; 222/495, 496; 239/585.5, 239/533.1
See application file for complete search history.

(56) References Cited

U.S. PATENT DOCUMENTS

| | | | | |
|---|---|---|---|---|
| 4,082,224 | A * | 4/1978 | Mangus .................... | 239/453 |
| 6,748,872 | B2 * | 6/2004 | Parrish .................... | 123/305 |
| 6,996,976 | B2 * | 2/2006 | Rumminger et al. ........... | 60/295 |
| 7,108,201 | B2 * | 9/2006 | Fischer .................. | F02M 61/18 239/533.1 |
| 7,603,849 | B2 * | 10/2009 | Hanitzsch et al. ............. | 60/286 |
| 7,905,425 | B2 * | 3/2011 | Hornby ................... | B23P 11/00 239/5 |
| 7,934,669 | B2 * | 5/2011 | Schurz ................... | F02M 61/20 123/299 |
| 8,028,514 | B2 * | 10/2011 | Niimi et al. ..................... | 60/286 |
| 8,087,239 | B2 * | 1/2012 | Bugos et al. ................... | 60/298 |
| 2003/0084869 | A1 | 5/2003 | Parrish | |
| 2003/0201344 | A1 * | 10/2003 | Wark ......................... | 239/533.8 |
| 2004/0004139 | A1 * | 1/2004 | Fischer ............. | F02M 51/0603 239/584 |
| 2006/0101810 | A1 * | 5/2006 | Angelo et al. .................. | 60/286 |
| 2008/0099585 | A1 * | 5/2008 | Ohata .................. | F02M 47/027 239/585.5 |
| 2010/0320285 | A1 * | 12/2010 | Haeberer et al. ............. | 239/132 |
| 2011/0239991 | A1 * | 10/2011 | Straub .......................... | 123/476 |

FOREIGN PATENT DOCUMENTS

| | | |
|---|---|---|
| DE | 102006061730 | 7/2007 |
| DE | 102006053556 | 5/2008 |

* cited by examiner

*Primary Examiner* — Arthur O Hall
*Assistant Examiner* — Juan C Barrera

(57) ABSTRACT

A dosing valve for administering a reducing agent into an exhaust stream within an exhaust manifold of an internal combustion engine. The dosing valve includes a valve needle internally coaxial to a valve body and held in a closed position by a force of compressed spring acting axially and held in relation to the valve needle and valve body. The negative impact of varnish and dehydrogenated compounds, or coking products, of hydrocarbon based reducing agents, is substantially reduced or eliminated. Additionally, this includes decreased sensitivity to the negative impact of the precipitates and crystals that come out of the solution due to temperature change with urea-based reducing agents.

7 Claims, 7 Drawing Sheets

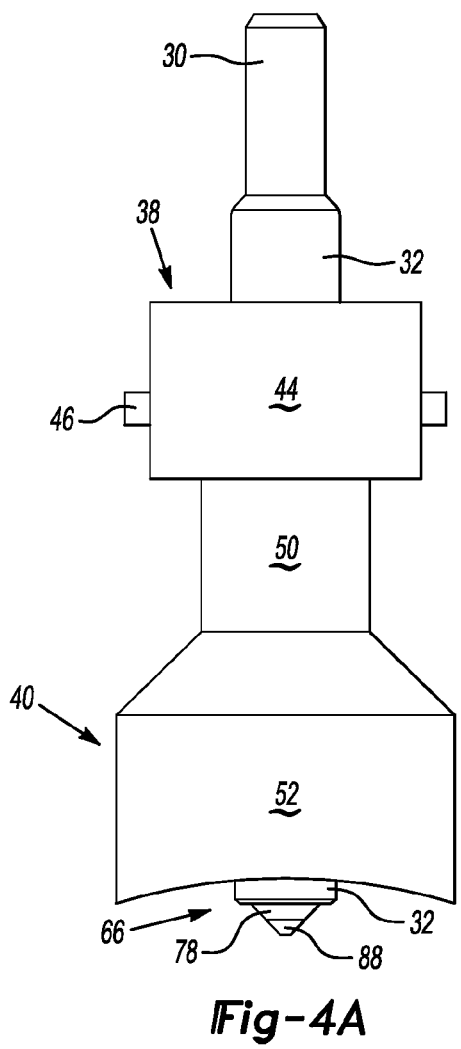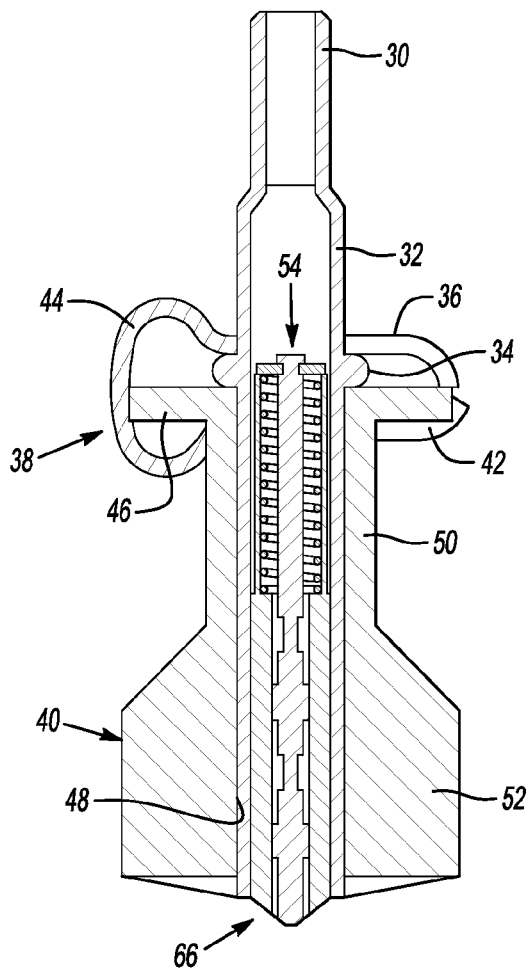

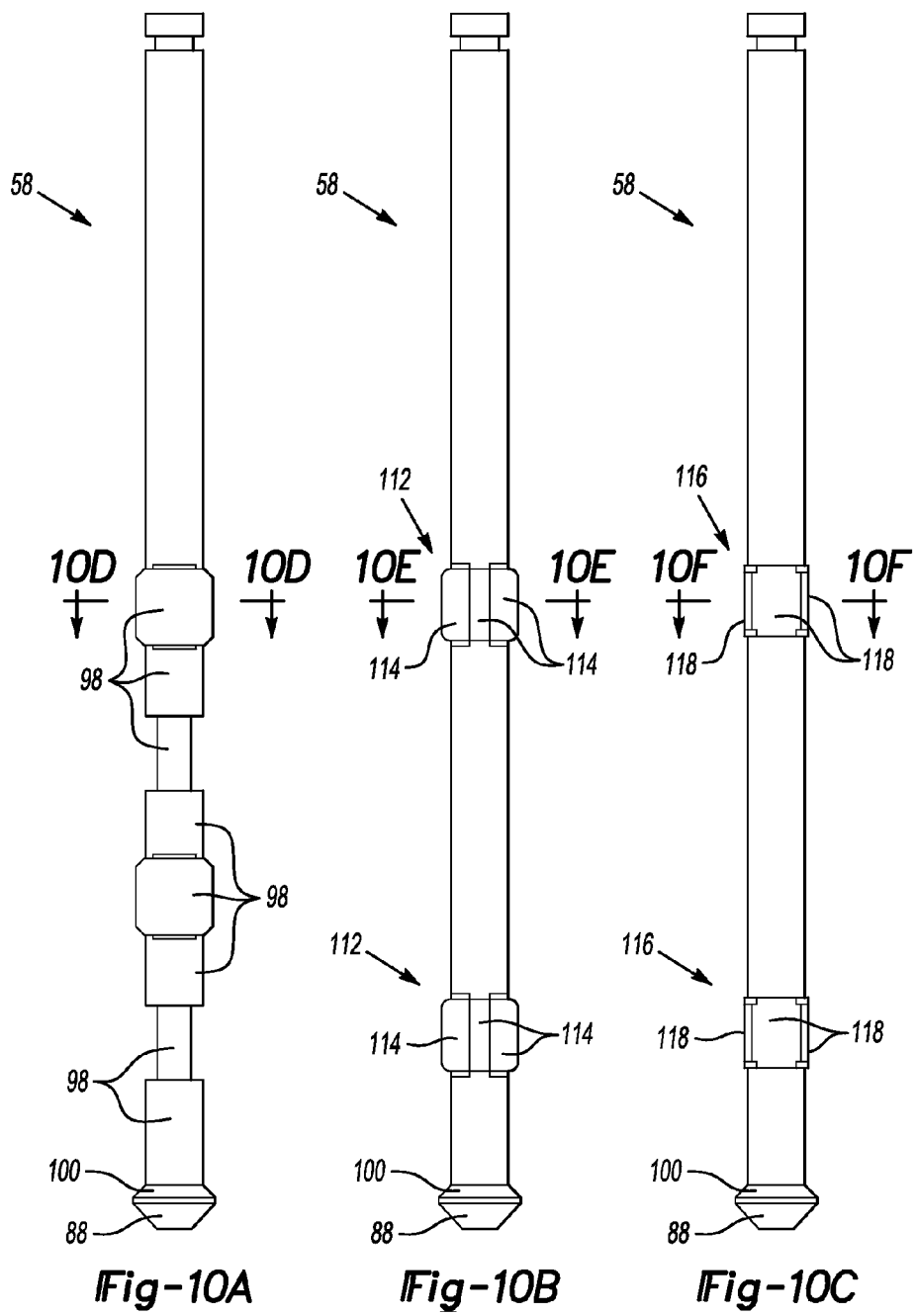
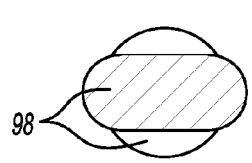
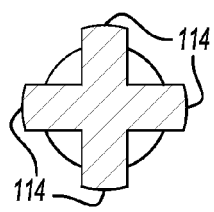
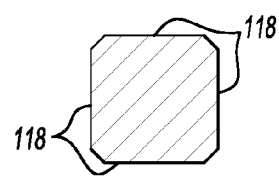
Fig-10A  Fig-10B  Fig-10C
Fig-10D  Fig-10E  Fig-10F

COKING RESISTANT AFTER-TREATMENT DOSING VALUE

FIELD OF THE INVENTION

The present invention relates generally to a system for reducing particulates and nitric oxide ($NO_x$) emissions by diesel engines, and more particularly, to a novel hydrocarbon (HC) or urea dosing valve system that eliminates the requirement for water cooling in a high temperature environment.

BACKGROUND OF THE INVENTION

Hydrocarbons and $NO_x$ emissions are a direct result of the combustion process in an internal combustion engine. To reduce such harmful emissions, catalytic converters are employed to reduce their toxicity. For gasoline engines, "three-way catalysts" are used to reduce nitrogen oxides to both nitrogen and oxygen, as shown by the equation below:

$$2NO_x \rightarrow xO_2 + N_2$$

These three-way catalysts are also used to oxidize carbon monoxide to carbon dioxide, which is shown by the second equation below:

$$2CO + O_2 \rightarrow 2CO_2$$

Furthermore, these three-way catalysts are also used to oxidize hydrocarbons into carbon dioxide and water, as shown by the third equation below:

$$C_xH_y + nO_2 \rightarrow xCO_2 + mH_2O$$

In the case of an engine which uses compression ignition, such as a diesel engine, the most commonly employed catalytic converter is the diesel oxidation catalyst. This catalyst employs excess $O_2$ in the exhaust gas stream to oxidize carbon monoxide to carbon dioxide and hydrocarbons to water and carbon dioxide. These converters virtually eliminate the typical odors associated with diesel engines, and reduce visible particulates; however they are not effective in reducing the $NO_x$ due to excess oxygen in the exhaust gas stream.

One way of reducing $NO_x$ emissions in a diesel engine utilizes a Selective Catalytic Reduction (SCR) Catalyst in the presence of a reducing agent such as ammonia ($NH_3$) to modify the engine exhaust. Existing technologies utilize SCR and $NO_x$ traps or $NO_x$ absorbers. The ammonia is typically stored on board a vehicle either in pure form, either as a liquid or gas, or in a bound form that is split hydrolytically to release the ammonia into the system.

An aqueous solution of urea is also commonly used as a reducing agent. The urea is stored in a reducing tank that associated with the system. A dosing valve disposed on the exhaust manifold upstream of a catalytic converter meters the delivery of a selected quantity of urea into the exhaust stream. When the urea is introduced into the high temperature exhaust, it is converted to a gaseous phase and the ammonia is released to facilitate reduction of $NO_x$. In lieu of ammonia, diesel fuel from the vehicle's fuel supply can be used as the reducing agent. In this expedient, a quantity of diesel fuel is administered directly into the exhaust via the dosing valve.

Additionally, particulate-specific traps accumulate unburned hydrocarbons, and dehydrogenated material is not removed by combusting a reducing agent such as diesel fuel to supply heat to oxidize or burn off these materials, this results in the trap reducing exhaust flow and increasing exhaust back pressure on the engine cylinders, reducing engine efficiency.

In either case, a dosing valve assembly is mounted directly on the exhaust manifold, and thus operates in a very high temperature environment that can reach temperatures as high as six-hundred degrees Celsius. Accordingly, the dosing valve is cooled to prevent decomposition or crystallization of the urea, or coking due to failure of diesel fuel reducing agent prior to delivery into the exhaust stream, and to maintain integrity of the dosing valve assembly.

The problems associated with this high temperature environment have previously been addressed by water cooling the assembly. However, this requires specialized plumbing and systems that ultimately increase costs and reduce reliability. Geometrical configurations can increase or decrease the sensitivity to deposits.

Additionally, there are challenges relating to the quality of the spray when the volume of exhaust in the after-treatment process required is less, such as for smaller engine classes as used in privately owned vehicles and commuter vehicles typically less than four liters, and usually near two liters in engine displacement. Accordingly, there exists a need for a dosing valve which overcomes problematic spray quality due to a smaller mass flow rate of a reducing agent.

SUMMARY OF THE INVENTION

Fundamentally, exhaust from a diesel engine is communicated through an exhaust manifold including a particulate-trap, which is coupled to a catalytic converter. The catalytic converter could be of the type that is well known in the art, which utilizes a selective catalytic reduction method to reduce the $NO_x$ content in the exhaust stream. A reducing agent, which in one embodiment may be diesel fuel, is introduced into the exhaust manifold via a dosing valve that is physically attached to manifold. According to embodiments of the present invention, the dosing valve fluidly communicates with a control valve that is disposed away from the exhaust manifold of the engine. The control valve receives a supply of diesel fuel that is stored in a fuel tank via a pressure regulator.

A fuel pump supplies diesel fuel under pressure from the vehicle storage tank to a regulator. The fuel pump and the control valve are electrically coupled to the vehicle electronic control unit (ECU). Another electronic unit may be employed, such as a dosing control unit (DCU) which could be disposed between ECU and control valve. These components are operative to meter a quantity of diesel fuel that is injected into the exhaust stream to reduce the $NO_x$ content in the exhaust stream. The reduction is effectuated by introducing a desired quantity of diesel fuel upstream of catalytic converter or particulate trap. Pressure sensors are disposed upstream and downstream of catalytic converter or particulate trap to enable these parameters to be communicated to ECT. In addition, temperature sensors and NOx sensors electrically communicate with ECU as is known in the art. The ECU monitors various parameters including temperature, pressure, and NOx content in the exhaust stream and consequently meters the introduction of diesel fuel into the exhaust stream to optimize the reduction of undesirable particulates and NOx emissions.

In one embodiment, a dosing valve assembly according to an embodiment of the present invention includes a control valve assembly, a fuel injector, where the fuel injector is part of the control valve assembly, and a spray valve assembly having a spray valve which includes a valve needle and a valve body having an aperture. The valve needle is movably disposed within the aperture of the valve body. A capillary delivery tube places the fuel injector in fluid communication with the spray valve assembly. A tapered portion is formed as part of the valve needle, an upper surface is formed as part of the tapered portion, a lower tapered portion is formed as part of the valve body of the spray valve, and a lower surface is formed as part of the lower tapered portion. An angled interface is formed by the upper surface and the lower surface which a reducing agent passes through when the spray valve is in an open position, and the spray valve assembly delivers the reducing agent to at least a portion of an exhaust system.

In view of the foregoing, it is an object of the invention to provide a dosing valve assembly for an internal combustion engine that eliminates the need for water cooling of the dosing valve. It is a further object of the invention to provide a dosing valve that is less sensitive to deposit or precipitate buildup on the internal functional components. Additionally, it is an object of the invention to provide a spray optimized design having lower delivery mass for use with smaller engine platforms.

In accordance with aspects of the invention, a dosing valve assembly is disclosed for administering a reducing agent, such as for example, diesel fuel, into an exhaust stream within an exhaust manifold of an internal combustion engine. The dosing valve assembly includes a control valve coupled to a source of the reducing agent, a spray valve assembly having a reducing agent delivery valve constructed and arranged for coupling to the exhaust manifold to enable a specified quantity of reducing agent to be administered into the exhaust stream, and an optimized elongated conduit disposed between the control valve and reducing agent delivery valve for fluidly communicating reducing agent from the control valve to the reducing agent delivery valve. The arrangement according to embodiments of the present invention enables the spray valve assembly to be coupled to the exhaust manifold, and the control valve to be displaced from the spray valve assembly and away from the high temperature environment associated with the exhaust manifold without sacrifice of spray quality and response time between control valve and spray valve.

In one embodiment, a spray valve assembly for administering a reducing agent into an exhaust stream within an exhaust manifold of an internal combustion engine in accordance with the invention includes an electronic fuel injector that operates as a control valve which is coupled to source of the reducing agent; a poppet or dosing valve constructed and arranged for coupling to the exhaust manifold to enable a specified quantity of reducing agent to be administered into the exhaust stream, the poppet valve including an inlet communicating with an elongated, optimized volume conduit disposed between the electronic fuel injector and poppet valve for fluidly communicating reducing agent from the electronic fuel injector to the spray valve, whereby, the spray valve may be coupled to the exhaust manifold and displaced from the electronic fuel injector. The electronic fuel injector is coupled to an electronic control unit that signals the fuel injector to permit or inhibit the flow of reducing agent to the poppet valve in response to various sensed parameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a side view of a spray valve assembly used with a dosing valve assembly, according to embodiments of the present invention;

FIG. 4B is a sectional side view of a spray valve assembly used with a dosing valve assembly, according to embodiments of the present invention;

FIG. 10A is a side view of a valve needle of a spray valve which is part of a spray valve assembly used with a dosing valve assembly, according to embodiments of the present invention;

FIG. 10B is a side view of another embodiment of a valve needle which is part of a spray valve assembly used with a dosing valve assembly, according to embodiments of the present invention;

FIG. 10C is a side view of another embodiment of a valve needle which is part of a spray valve assembly used with a dosing valve assembly, according to embodiments of the present invention;

FIG. 10D is sectional view taken along lines 10D-10D of FIG. 10A;

FIG. 10E is sectional view taken along lines 10E-10E of FIG. 10B; and

FIG. 10F is sectional view taken along lines 10E-10F of FIG. 10C.

DETAILED DESCRIPTION OF THE PREFERRED EMBODIMENTS

The following description of the preferred embodiment(s) is merely exemplary in nature and is in no way intended to limit the invention, its application, or uses.

Figure 1:
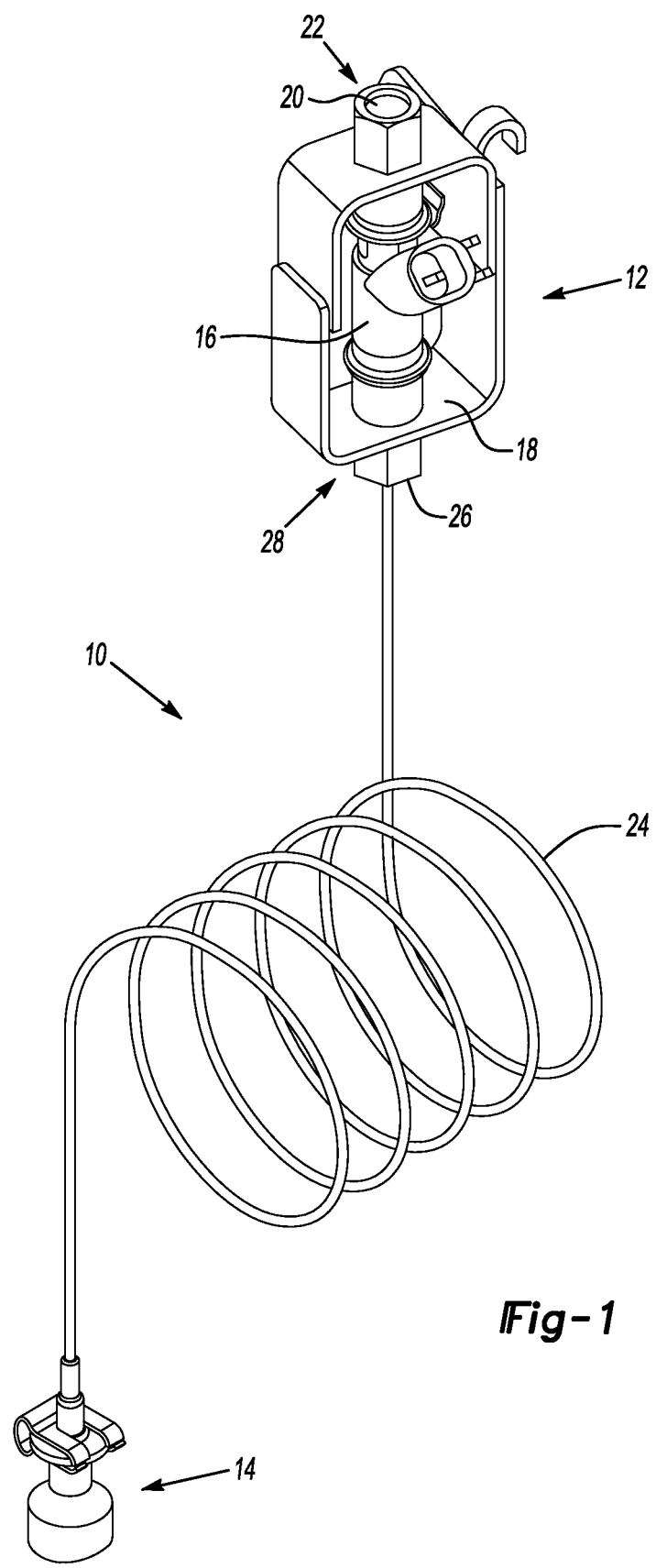
FIG. 1 is a perspective view of a dosing valve assembly, according to embodiments of the present invention.
Figure 2:
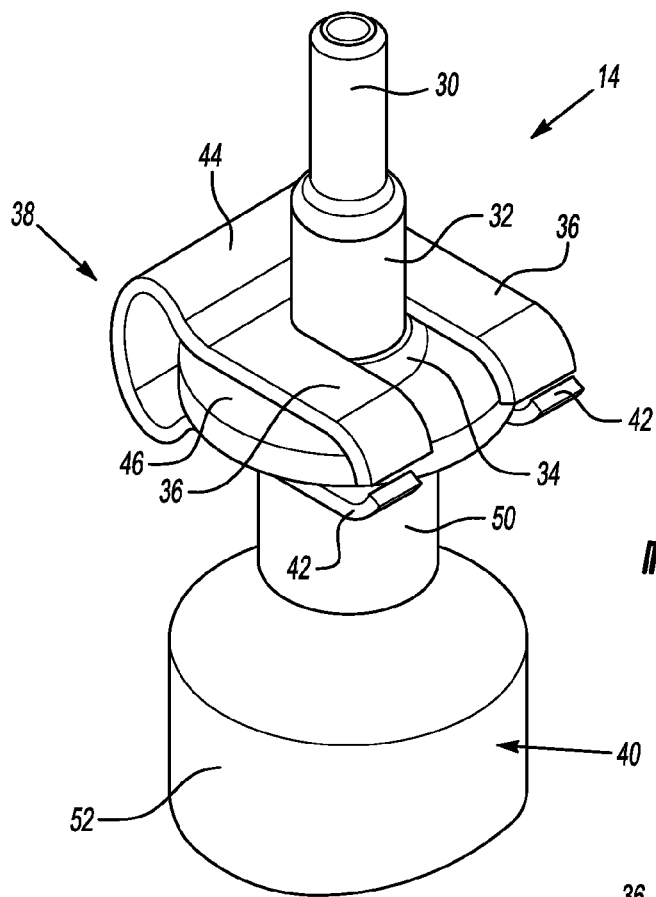
FIG. 2 is a first perspective view of a spray valve assembly used with a dosing valve assembly, according to embodiments of the present invention.
Figure 3:
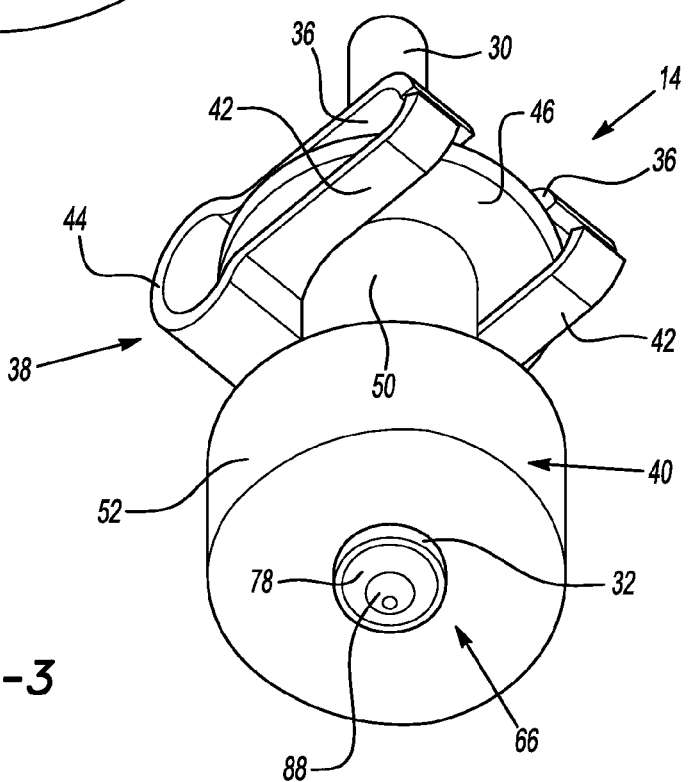
FIG. 3 is a second perspective view of a spray valve assembly used with a dosing valve assembly, according to embodiments of the present invention.
Figure 5:
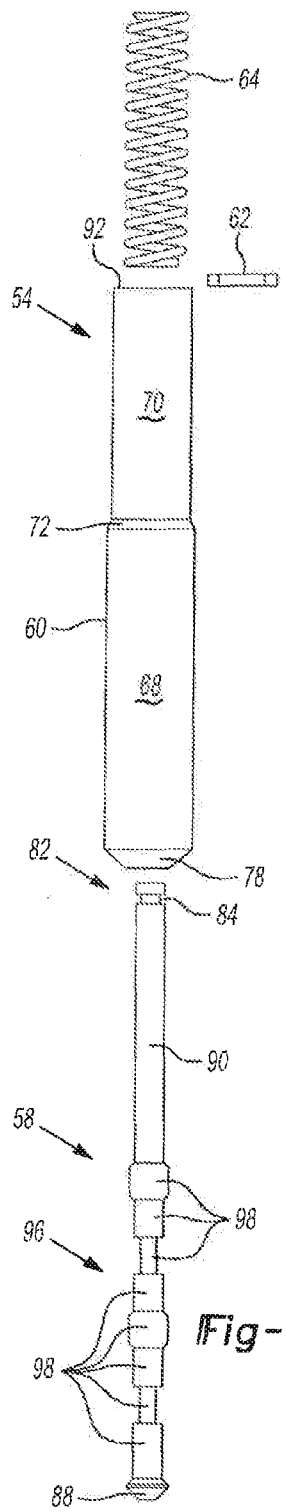
FIG. 5 is an exploded view of a spray valve which is part of a spray valve assembly used with a dosing valve assembly, according to embodiments of the present invention.

Referring now to FIG. 1, a dosing valve assembly according to embodiments of the present invention is shown generally at 10. The dosing valve assembly 10 includes a control valve assembly, shown generally at 12, and a spray valve assembly, shown generally at 14. The control valve assembly 12 has a fuel injector 16 that includes an electronic control element (not shown) that couples the dosing valve to the ECU and DCU. The fuel injector 16 is mounted to and supported by a bracket 18 for mounting the assembly within the vehicle. A fuel inlet 20 on a first end, shown generally at 22, of the fuel injector 16 receives a supply of diesel fuel from a fuel tank.

The fuel injector 16 is fluidly coupled to the spray valve assembly 14 though a capillary or low volume connecting tube 24, which has a length sufficient to displace the control valve assembly 12 from the high temperature environment in proximity to the exhaust manifold, and a volume small enough to be pressurized in a timely fashion to have the dosing valve assembly 10 operate within a useful delay from activation of the control valve assembly 12. The tube 24 is connected to a fuel outlet 26 on a second end, shown generally at 28, of the injector 16. The spray valve assembly 14 of the dosing valve assembly 10 is mounted directly on the exhaust manifold and described in further detail below.

Referring now to FIG. 2-4B, a spray valve assembly is shown, which in one embodiment may be mounted on an exhaust manifold to deliver a reducing agent (e.g., diesel fuel) into the exhaust stream. The tube 24 is connected to an inlet 30 which is formed as part of a body portion 32. The body portion 32 includes a circumferential lip 34 which contacts the upper flanges 36 of a mounting clip, generally shown at 38, used for attaching and holding the body portion 32 for connection with a suitable exhaust boss, shown generally at 40. The mounting clip 38 also includes lower flanges 42, which contact the circumferential lip 34 and a base portion 44. Also disposed between the flanges 36,42 is a flange 46 integrally formed as part of the exhaust boss 40. The exhaust boss 40 also includes a channel 48, through which the body portion 32 extends, a central portion 50, and an enlarged base portion 52. The flange 46 and the enlarged base portion 52 are integrally formed with the central portion 50.

Figure 6A:
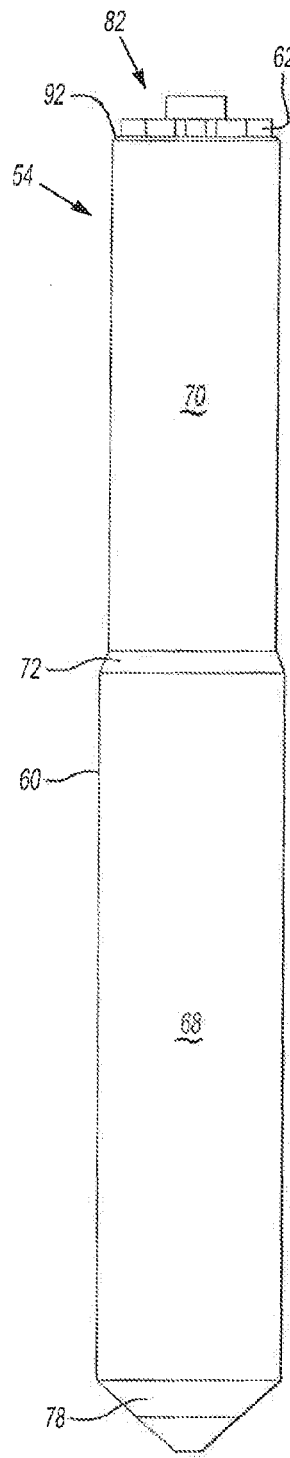
FIG. 6A is a side view of a spray valve which is part of a spray valve assembly used with a dosing valve assembly, according to embodiments of the present invention.
Figure 6B:
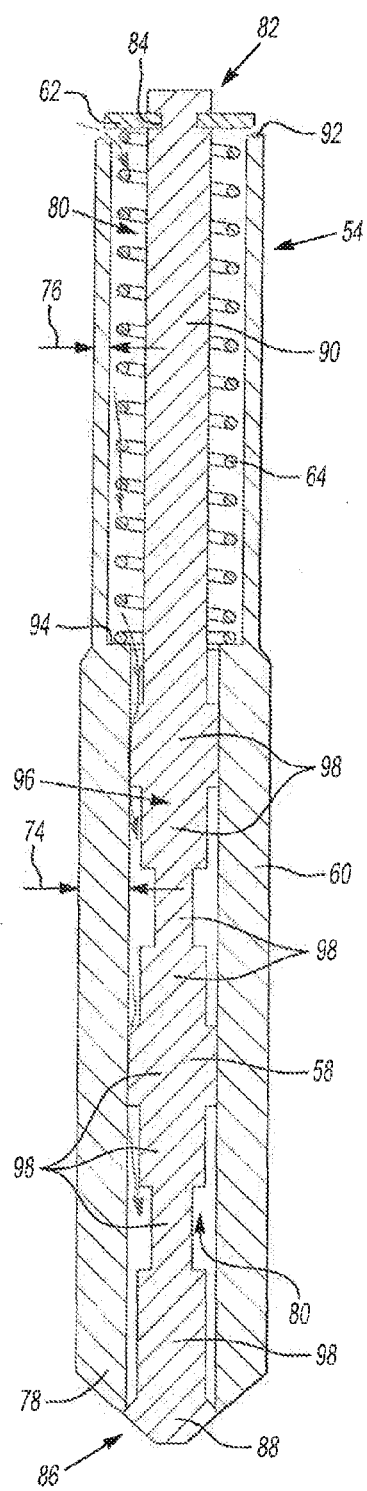
FIG. 6B is a sectional side view of a spray valve which is part of a spray valve assembly used with a dosing valve assembly, according to embodiments of the present invention.

The present invention is not limited for use only with the mounting clip 38, other types of clips may be used with the dosing valve assembly 10, such as a spring clip, quick-release clamp, or a crimp clamp, and may be within the scope of the invention. Some types of dosing valves have been mounted using the exhaust boss 40 in combination with threads; this requires additional precautions in manufacture and assembly that increases manufacturing cost compared to the mounting clip 38 or other types of clips mentioned above. The inlet 30 receives fuel from the control valve assembly 12. In an embodiment, disposed within the body portion 32 is a spray valve, shown generally at 54. The spray valve 54 includes a valve needle 58, a valve body 60, and a spring clip 62 that holds a spring 64 in compression axially along the valve needle 58 in relation to the valve body 60. Assembled part locations are shown in FIGS. 4B and 6B.

The spray valve 54 is disposed in the body portion 32, through a connection, such as a press-fit connection, as shown in FIG. 4B. However, it is within the scope of the invention that other types of connections may be used to connect the spray valve 54 to the body portion 32. The spray valve 54 partially extends out of the lower end, shown generally at 66, of the body portion 32, and is disposed in the body portion 32 below the inlet 30.

The valve body 60 includes a large diameter portion 68 and a smaller diameter portion 70, which are connected by a tapered portion 72. The large diameter portion 68 includes a thick sidewall 74, and the smaller diameter portion includes a thin sidewall 76. The large diameter portion 68 also includes a lower tapered portion 78. Extending through the valve body 60 and both sidewalls 74,76 is an aperture, shown generally at 80. The aperture 80 has two different inner diameters corresponding to the inner diameters of each of the sidewalls 74,76. Disposed in the aperture 80 are the valve needle 58 and the spring 64. The valve needle 58 is slidably disposed in the aperture 80, and on a first end, shown generally at 82, includes a groove 84 which receives the spring clip 62. On a second end, generally shown at 86, the valve needle 58 includes a tapered portion 88.

The valve needle 58 also includes an upper portion 90 which includes the groove 84, and is substantially disposed in the small diameter portion 70. However, a portion of the upper portion 90 protrudes out of the small diameter portion 70 is shown in FIGS. 4B and 6B such that the groove 84 is outside of the valve body 60. The spring clip 62 is located in the groove 84 and contacts an upper ledge 92 formed as part of the small diameter portion 70. Also disposed in the small diameter portion 70 of the valve body 60 (and in part of the aperture 80) is the spring 64. The spring 64 contacts the spring clip 62, and also contacts a lower ledge 94 formed as part of the large diameter portion 68. The spring 64 is compressed by the spring clip 62 and the lower ledge 94, the function of which will be described later.

The valve needle 58 also has a lower portion, shown generally at 96, connected to the upper portion 90. The lower portion 96 has a plurality of deformations 98. In the embodiment shown in FIGS. 6B, 10A, and 10D, there are eight deformations 98 (four types of deformations, and two of each type of deformation 98), but it is within the scope of the invention that in other embodiments, more or less deformations 98 may be used. Each deformation 98 contacts a different area of the inside surface of the thick sidewall 74, best seen in FIG. 6B.

Figure 7:
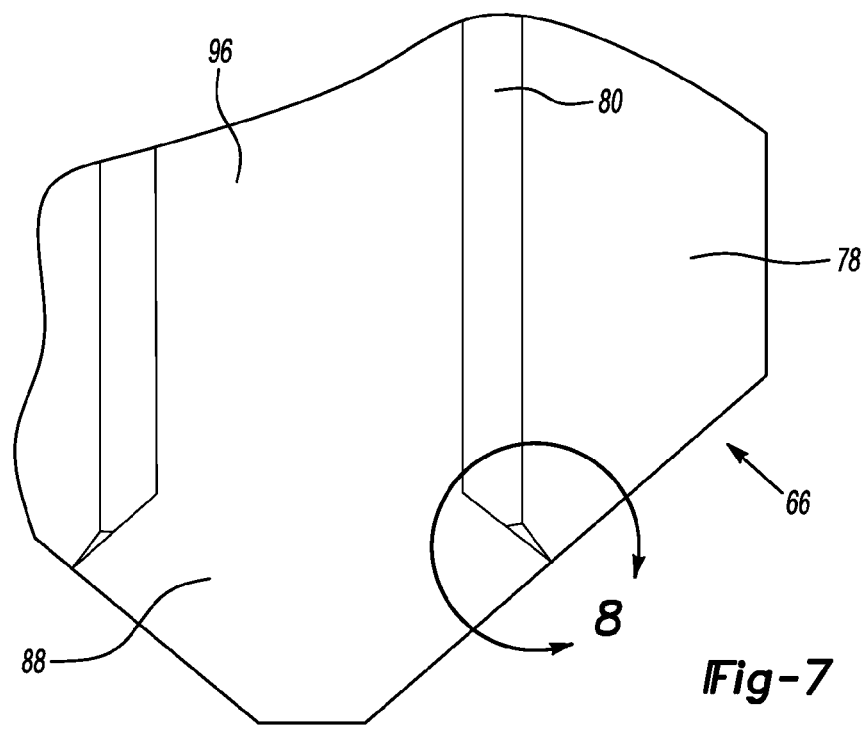
FIG. 7 is an enlarged sectional view of the lower end of the body portion and the tapered portion of a valve needle, which are part of a spray valve, according to the present invention.
Figure 8:
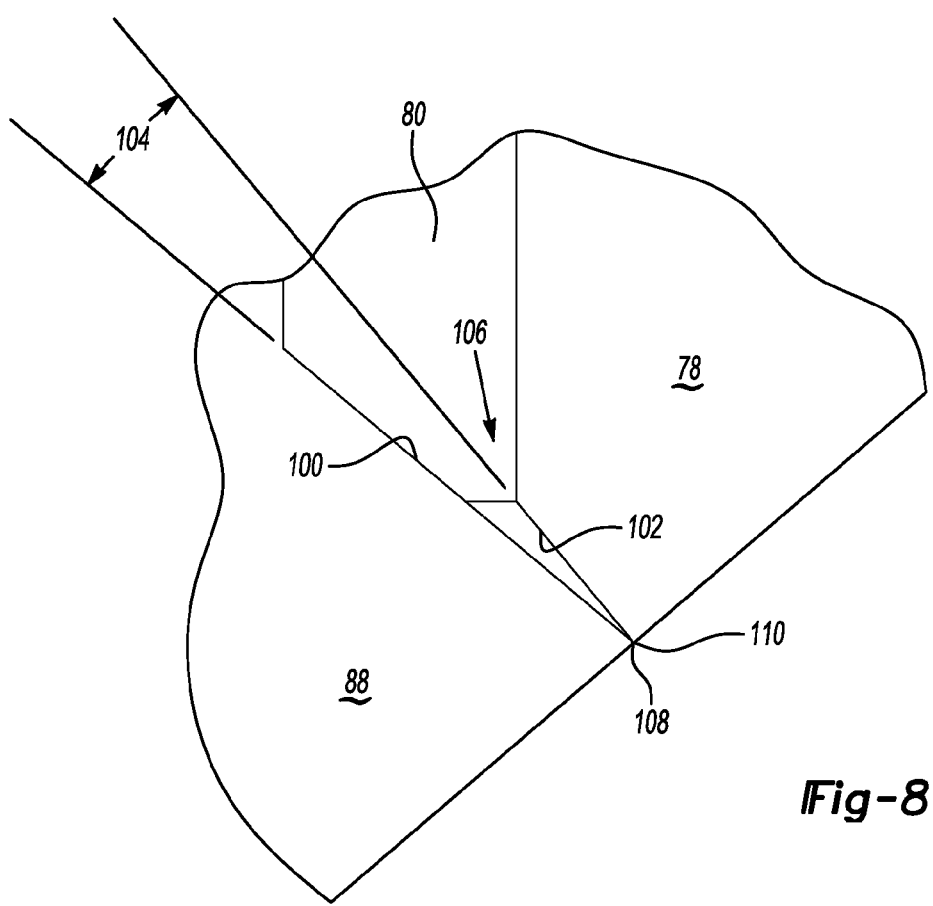
FIG. 8 is a greatly enlarged view of the circled portion of FIG. 7.
Figure 9:
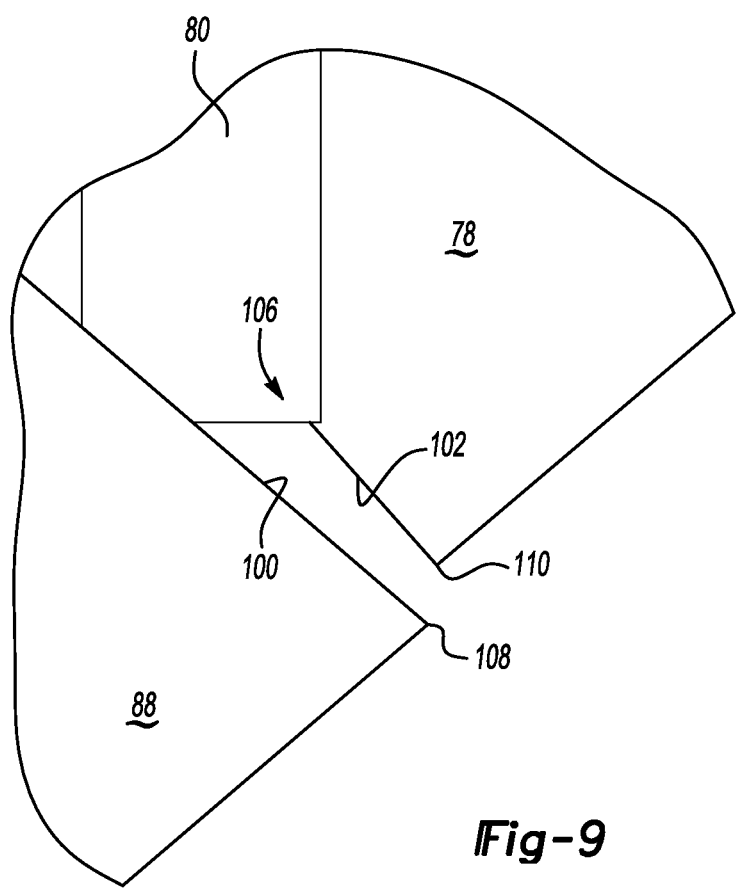
FIG. 9 is a greatly enlarged view of a section of the body portion and the tapered portion of a valve needle in an open position, which are part of a spray valve, according to the present invention.

As mentioned above, the lower portion 96 of the valve needle 58 includes the tapered portion 88, and the large diameter portion 68 of the valve body 60 includes the lower tapered portion 78. Referring to FIGS. 7-9, the tapered portion 88 includes an upper surface 100, and the lower tapered portion 78 includes a lower surface 102. The upper surface 100 and lower surface 102 are conical surfaces and are positioned at an angle 104 relative to one another when the spray valve 54 is in the closed position, as shown in FIGS. 7 and 8. The angle 104 formed between the two surfaces 100,102 creates an opening, or angled interface, shown generally at 106, which allows for fluid flow when the spray valve 54 is in an open position, as shown in FIG. 9.

The distance between the spring clip 62 and the lower ledge 94 is less than the length of the spring 64 when the spring 64 is in a completely relaxed position. Therefore, there is a constant force applied to the spring clip 62 and the lower ledge 94, biasing the valve needle 58 upward, and therefore biasing the spray valve 54 toward a closed position.

Under the control of the vehicle's ECU/DCU, the control valve assembly 12 releases a quantity of fuel to the spray valve assembly 14 via the connecting tube 24. The fuel flows through the connecting tube 24, the inlet 30, the body portion 32, and around the spring clip 62 and through the aperture 80 as shown by the arrowed lines in FIG. 6B. The fuel flows through the aperture 80 through both the small diameter portion 70 and the large diameter portion 68. The fuel also flows around the deformations 98 and applies pressure to each of the surfaces 100,102. The fuel under pressure generates a force across an area of each of the surfaces 100,102 that biases the valve needle 58, overcoming the force of spring 64, placing the spay valve 54 in the open position shown in FIG. 9, thereby enabling a quantity of fuel to flow through the angled interface 106 between valve needle 58 and valve body 60. When the control valve assembly 12 restricts the flow of fuel through the connecting tube 24, the reduced fuel pressure is overcome by the force of spring 64 to move the valve needle 58 upwardly such that the outer edge 110 of the lower surface 102 contacts the outer edge 108 of the upper surface 100, closing off the spray valve 54, and the flow of fuel is prevented from entering the exhaust manifold.

The conical surface 100 of the valve needle 58 and respective conical surface 102 of the lowered tapered portion 78 of the valve body 60 are designed such that as the fluid moves past the surfaces 100,102 to the exhaust atmosphere, the flow area decreases even though the flow geometry increases in average diameter. This has the effect of increasing fluid velocity and simultaneously the conical liquid sheet formed is decreasing in thickness as the conical liquid sheet flows outward. This creates a fluid momentum that has a radial vector force to overcome the viscous forces of the liquid that have a force vector pointing toward the axis of the conical liquid sheet. The contact angle 104 is selected not only for the decreasing area effect with increasing flow diameter, but for having the surfaces 100,102 converge such that the surfaces 100,102 meet at as close to a circular line as possible to reduce the area sensitive to deposit buildup. The angle 104 is generally in the range of ten degrees to thirty degrees, but it is within the scope of the invention that greater or lesser angles may be used.

While one embodiment of the valve needle 58 is described above, other embodiments of the valve needle 58 are also possible. Possible alternate embodiments of the valve needle 58 are shown in FIGS. 10B, 10C, 10E, and 10F. While the scope of the invention is not limited to these, three proposed manufacturing strategies are shown in FIGS. 10A, 10B, 10C, 10D, 10E, and 10F.

FIGS. 10A and 10D show an embodiment where the valve needle 58 is made from suitable wire, such as Inconel 718 or Pyromet 718, 200, or 300 series Austenitic Stainless, and is used in the embodiment described above. The wire is deformed in four different ways to create the deformations 98, each rotated one-hundred-eighty degrees circumferentially from the other, creating an effective eight-point guide that rides within the inside diameter of the thick side wall 74 of the valve body 60. The contact area formed between the deformations 98 and the inside diameter of the thick side wall 74 is very low, yet the length over diameter ratio is large enough to provide appropriate guiding for axial translation of the valve needle 58 within the valve body 60. The low contact area increases the local force applied to the inner surface of the thick side wall 74 to overcome deposits that may form between the valve needle 58 and the area of the aperture 80 along the inside diameter of the thick side wall 74 of the valve body 60.

FIGS. 10B and 10E show another embodiment and technique of manufacture from wire where the geometry of the valve needle 58 is made by creating another type of deformation, generally shown at 112. Each deformation 112 has four guide protrusions 114 which contact the inside diameter of the thick side wall 74 during operation of the spray valve 54. In this embodiment, there must be at least one deformation 112 in at least one location, and the deformation 112 must have at least three guide protrusions 114 to provide adequate centering and guiding. Three guide protrusions 114 provide three contact points, which is required because at least three contact points are necessary to define a circle geometrically on a two dimensional surface. In this embodiment, there are two deformations 112, each having four guide protrusions 114 which provide centering and guiding.

FIGS. 10C and 10F show another embodiment of a valve needle 58, which has been machined, rather than deformed. FIGS. 10C and 10F show a valve needle 58 having two locations, shown generally at 116 with four contact areas 118. In an alternate embodiment, there may be one location 116 having three contact areas 118, because at least one location with three contact areas are needed to provide centering and guiding within the inside diameter of the thick side wall 74 of the valve body 60. However, it is also within the scope of the invention that more locations 116 having more contact areas 118 may be used. Again, all embodiments of FIGS. 10A, 10B, 10C, 10D, 10E, and 10F show a reduced contact area and large length over diameter number for reducing sensitivity to deposits.

The foregoing detailed description is to be understood as being in every respect illustrative and exemplary, but not restrictive, and the scope of the invention disclosed herein is not to be determined form the description of the invention, but rather from the claims as interpreted according to the full breath permitted by the patent laws. For example, while the method is disclosed herein with respect to tubular components of a fuel injector, the techniques are configurations of the invention may be applied to other tubular components where a hermetric weld is required. It is to be understood that the embodiments shown and described herein are only illustrative of the principles of the present invention and that various modifications may be implemented by those skilled in the art without departing from the scope and spirit of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coking-resistant dosing valve (dosing valve) comprising:
    an elongated valve body having first and second opposing ends, the first end comprising a first, truncated cone section and a substantially straight, substantially tubular aperture extending completely through the elongated valve body between the first and second opposing ends, the first truncated cone section comprising an interior conical surface surrounded by an exterior conical surface, the second end comprising an inlet through which fluids can pass into the aperture; an elongated valve needle inside the tubular aperture of the elongated valve body, the elongated valve needle having first and second opposing ends and being movably disposed in the aperture of the elongated valve body, the elongated valve needle first end located at and extending from the first truncated cone section of the elongated valve body and comprising:
    first and second, back-to-back cone-shaped portions, the first cone-shaped portion having a narrowed top end that faces into the interior conical surface of the first truncated cone section of the elongated valve body, the second cone-shaped portion also having a narrowed top end, which faces away from the elongated valve body;
    a spring operatively coupled to the elongated valve needle and elongated valve body, the spring being sized, shaped and arranged to bias the first cone-shaped portion against the interior conical surface;
    wherein the dosing valve has a closed position where part of the first cone-shaped portion of the valve needle is inside and in contact with said interior conical surface responsive to force provided by said spring, the dosing valve having an open position where the valve needle is moved to an open position in the tubular aperture, only responsive to pressure applied to fluid in the aperture and the first cone-shaped portion of the valve needle being separated from the interior conical surface thereby allowing fluid to be expelled from the dosing valve through a space located between the interior conical surface of the first truncated cone section and the first cone-shaped portion of the first end of the valve needle.

2. The dosing valve of claim 1, wherein the valve body and valve needle are configured such that fluid flows substantially axially through the valve body aperture and substantially axially through the space between the interior conical surface of the first truncated cone section and the first cone-shaped portion of the first end of the valve needle.

3. The dosing valve of claim 2, wherein the interior conical surface of the first truncated cone section is inclined at a first angle and wherein the first cone-shaped portion of the elongated valve needle is inclined at a different second angle.

4. The dosing valve of claim 3, wherein the first and second angles differ by an amount that is between about ten degrees up to about thirty degrees.

5. The dosing valve of claim 3, further comprising a delivery tube connected to the inlet of the elongated valve body.

6. The dosing valve of claim 1, the valve needle further comprising at least one deformation in sliding contact with the inside surface of the aperture formed as part of the valve body, reducing the contact area between the valve needle and the valve body, the deformation being configured to allow fluid to flow around it.

7. The dosing valve of claim 1, wherein the valve needle is a single, integrally-formed unit and comprised of at least one of: Inconel® and Pyromet®.

* * * * *